J. L. ROWLAND.

MANUFACTURE OF ARTIFICIAL STONE.

No. 7,084. Reissued April 25, 1876.

Witnesses.
James Martin Jr.
J. P. Theodore Lang.

Inventor.
James L. Rowland
by
Mann, Pennie & Lawrence.

N. PETERS, PHOTO-LITHOGRAPHER, WASHINGTON, D. C.

UNITED STATES PATENT OFFICE.

JAMES L. ROWLAND, OF NEW YORK, N. Y.

IMPROVEMENT IN THE MANUFACTURE OF ARTIFICIAL STONE.

Specification forming part of Letters Patent No. 137,322, dated April 1, 1873; reissue No. 6,234, dated January 12, 1875; reissue No. 7,084, dated April 25, 1876; application filed April 5, 1876.

*To all whom it may concern:*

Be it known that I, JAMES L. ROWLAND, formerly of Milwaukee, in the county of Milwaukee and State of Wisconsin, but now of the city, county, and State of New York, have invented new and useful Improvements in the Manufacture of Stone Artificially; and I do hereby declare that the following is a full, clear, and exact description thereof, reference being had to the accompanying drawings, which form a part of this specification.

My invention relates to a process in the manufacture of stone artificially, whereby the material or substances composing the stone, after being molded or wrought into forms or articles, are in such forms, in part or in whole, indurated or transformed into stone by being subjected to gas evolved from the burning of carbonaceous matter; and it also relates to apparatus used in carrying out the process. And my invention mainly consists in the treatment of said materials or substances with gas generated by the burning of carbonaceous matter, which gas so generated has its temperature reduced or subjected to a cooling process before passing into a chamber containing the substance to be indurated, in order to prevent the premature drying of the material or articles to be indurated which would arise from the application of highly-heated gas to them when, from neglect or for any other reason, an insufficient amount of moisture is supplied to such material or articles; and my invention further consists in certain constructions, combinations, and arrangements in apparatus for carrying my invention into effect, as hereinafter described and specifically claimed.

Figure 1:
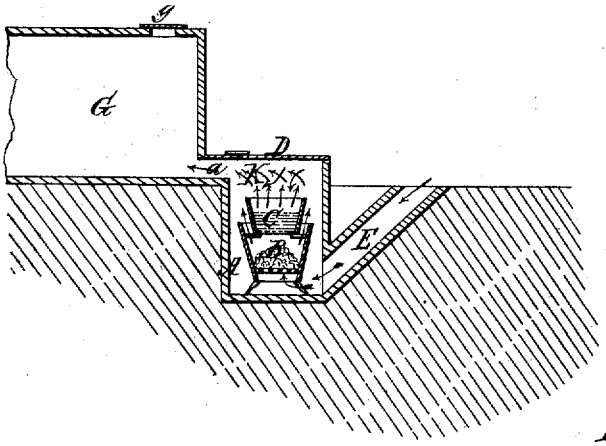
Figure 2:
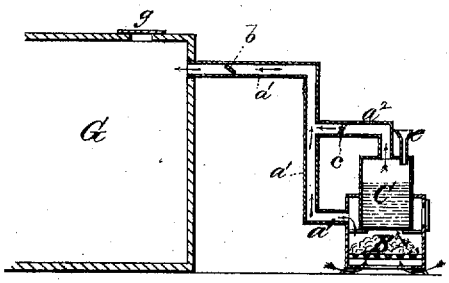
Figure 3:
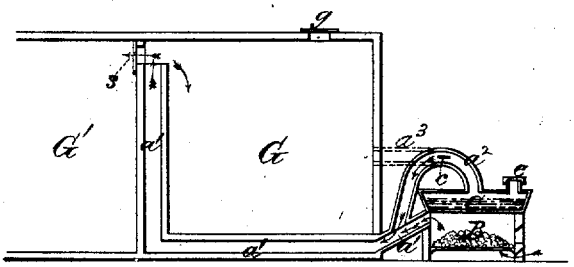
Figure 4:
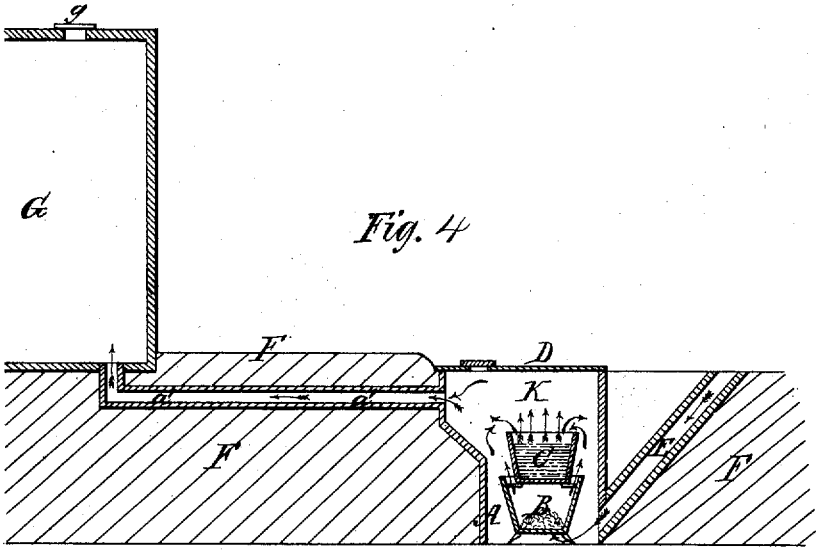

Figure 1 shows one form of apparatus by means of which I put my invention into practice. Fig. 2 shows another form of apparatus by means of which I practice my invention. Figs. 3 and 4 show apparatus by means of which I practice my invention, and by which I reduce the temperature of the gas by cooling agent other than as practiced in Figs. 1 and 2.

In the accompanying drawings, A, Fig. 1, represents a pit, which is constructed below the surface of the ground, for the purpose of containing a gas-generator and a steam or vapor generator. The gas-generator, as indicated at B, is a simple furnace, in which charcoal is burned, thereby evolving carbonic-acid gas. This furnace is supplied with air by means of an inclined passage, E. The furnace is open at its top, and supports an open vessel, C, by means of lugs, or in any other suitable manner. Into the vessel C water is put for the purpose of generating vapor.

It will be seen that I here produce vapor by heat of the same furnace in which the gas is generated.

There is a space or chamber, K, between the evaporating-pan C and the hinged cover D of the pit A, in which the gas and the watery particles of the vapor commingle, thereby charging the vapor with the gas, and reducing the temperature of the gas before it enters an apartment, G, which it does through a short passage, *a*, mixed with the vapor, as indicated in Fig. 1. The material to be indurated, having been put into the chamber G, is therein subjected to the action of the gas which it absorbs. At the top of the chamber G is a hole, which is provided with a movable cover, *g*, for the purpose of allowing air, gas, or vapor to escape, when desired, and, if necessary, may be used as a draft-passage in first starting the fire.

In Fig. 2 I have represented another form of apparatus for carrying my invention into practice, wherein the gas and vapor generators are represented arranged on the surface of the ground. In this instance, as before, I provide a furnace, as at B, for burning charcoal or other carbonaceous material, at the top of which is a vapor-generator, C, but, in addition, provide a pipe, as indicated at $a^1$, of suitable size and length, and exposed to the open air, which communicates between the indurating-apartment G and the furnace B, through which pipe $a^1$ the gas, generated in the furnace B, passes into said chamber G. A pipe, as at $a^2$, leads from the vapor-generator C and connects with the pipe $a^1$, as shown in said Fig. 2, and conducts the vapor from the generator C into the pipe $a^1$ at the point of connection of the pipes, at which point the vapor and gas commingle, and together thence pass on through pipe $a^1$ into the apartment G.

It will thus be seen that, under this mode or way of carrying my invention into practice, the gas escaping from the furnace B is subjected to a cooling or reduction of its temperature, not only owing to its commingling with the vapor in the pipe $a^1$, but also to its passage through the whole length of the pipe $a^1$ before it enters the apartment G; and, further, that during such passage the watery particles of the vapor, by commingling with the gas, become charged with the gas before entering the apartment G.

In Figs. 3 and 4 of the drawings, I illustrate a different way of putting my invention into practice, and which subjects the gas evolved from burning carbonaceous matter to another cooling agent prior to its entrance into the indurating-apartment G. In Fig. 3, B indicates a furnace for generating gas by burning carbonaceous matter, and C a vapor-generator. A pipe or flue, $a^1$, communicates between the furnace B and the indurating-apartment G. This pipe or flue $a^1$, a portion of its length, is, in this instance, carried along the floor of the apartment G in contact with the ground, as a means for cooling or reducing the temperature of the gas. The ground thus being in contact with the pipe or flue serves as a cooling agent for the gas, when gas unmixed with vapor is passed through the pipe or flue, as well as when vapor mixed with the gas is passed through the pipe or flue from the furnace B to the apartment G.

From the vapor-generator C, in said Fig. 3, I have provided a vapor-pipe, $a^2$, which extends down and connects with the gas pipe or flue $a^1$, so that the vapor and the gas may mix in the pipe or flue $a^1$, and, together, be carried along and discharged into the indurating-apartment G. But instead of the vapor-pipe $a^2$ entering the gas pipe or flue $a^1$, this pipe $a^2$ may be carried directly into the chamber G, as indicated in dotted lines $a^3$, so that the vapor will not mix with the gas until they both get into this chamber G.

In Fig. 4 the gas pipe or flue $a^1$ is embedded in the ground F beneath its surface a considerable distance as a means or agent for reducing the temperature of the gas before it enters the hardening or indurating chamber G; and in connection with the gas pipe or flue thus embedded, the vapor-generator C and furnace B, with their connecting-pipes above ground, as shown in Fig. 3, may be used, instead of using the vapor-generator and furnace below ground, as shown in Fig. 4, so that the gas alone, unmixed with vapor, may be passed through the pipe or flue $a^1$ when thus embedded.

In Figs. 2 and 3 a device, as at *e*, is provided, by means of which water may be supplied to the vapor-generator C; and in these two figures I also show a valve, marked *c*, to regulate the flow of the steam or vapor. In Fig. 2 I provide a valve, *b*, for regulating the flow of the gas and vapor into the apartment G, after the gas and vapor have been mixed. I have also represented in Fig. 3 two hardening-chambers, G G′, with a communication, *s*, between their division-wall, (which may be provided with a valve,) so that the chambers can be charged together. In this way any desired number of chambers may communicate with the generators B and C.

I have thus described different modes and apparatus, simple in their parts and mode of construction, whereby gas can be subjected to a cooling process, and its temperature reduced before it enters the chamber G, and whereby my invention may be practiced; but I do not confine myself to either one or all of the modes or apparatus herein specified and shown for reducing the temperature of the gas prior to its introduction into the indurating-chamber G, and carrying my invention into practice, since other suitable cooling media, agents or agencies, and apparatus and devices, may be adopted instead of those herein specified, whereby a reduction of the temperature of the gas prior to its introduction into the indurating-chamber G may be effected, and whereby my invention may be practiced.

Having described my invention, what I claim as new, and desire to secure by Letters Patent, is—

1. In an apparatus for manufacturing stone artificially, an indurating or curing chamber, G, in combination with a gas-generator and a vapor or steam generator, substantially as described.

2. In an apparatus for manufacturing stone artificially, a gas and vapor mixing chamber, pipe, or passage, in combination with a gas-generator, a vapor or steam generator, and an indurating or curing chamber, substantially as described.

3. In an apparatus for manufacturing stone artificially, a gas and vapor mixing chamber, pipe, or passage, wherein the gas and vapor or steam commingle before being introduced into the indurating or curing chamber, for the purpose set forth.

4. In an apparatus for manufacturing stone artificially, by the use of gas generated by the burning of carbonaceous matter, a gas pipe or flue, subjected in part or in whole to a cooling medium or agent, other than atmospheric air, for reducing the temperature of such gas in its passage through the pipe or flue into the indurating-chamber.

5. In the manufacture of stone artificially, with the use of gas evolved by the burning of carbonaceous matter, and after its evolution subjected to cooling agencies, or a cooling process, for the purpose of reducing its temperature before the application of the gas to the material or articles treated with it, I claim such cooling of the gas or reducing its temperature effected before the introduction of the gas into the indurating-chamber.

6. In the manufacture of stone artificially, in which the material to be indurated is treated with gas generated by the burning of carbonaceous matter, I claim such gas when it has been subjected to a cooling process before its introduction into an indurating-chamber.

7. In the manufacture of stone artificially, vapor, in combination with gas generated by the burning of carbonaceous matter, when such gas has been subjected to a cooling process before its introduction into an indurating-chamber.

8. The process of treating the material to be indurated or transformed into stone with gas generated by the burning of carbonaceous matter, and subjected to a cooling agent or agencies, whereby it has its temperature reduced before its introduction into the indurating-chamber, substantially as described.

JAMES L. ROWLAND.

Witnesses:
W. P. BELL,
S. A. TERRY.